(12) United States Patent
Cochran et al.

(10) Patent No.: US 8,500,074 B1
(45) Date of Patent: Aug. 6, 2013

(54) BICYCLE STORAGE TREE

(76) Inventors: Scott Cochran, Jackson, MO (US);
Michelle Gullett, Jackson, MO (US)

( * ) Notice: Subject to any disclaimer, the term of this patent is extended or adjusted under 35 U.S.C. 154(b) by 433 days.

(21) Appl. No.: 12/815,506

(22) Filed: Jun. 15, 2010

(51) Int. Cl.
*A47K 1/04* (2006.01)
*A47F 7/00* (2006.01)

(52) U.S. Cl.
USPC ............................................ 248/129; 211/17

(58) Field of Classification Search
USPC ................. 211/17, 18, 19, 20, 21, 22, 23, 24, 211/106.01, 13.1, 39, 89.01, 1.3, 196, 205, 211/197, 175; 248/121, 127, 128, 129; 280/79.3, 638, 35, 79.11, 47.35
See application file for complete search history.

(56) References Cited

U.S. PATENT DOCUMENTS

| | | | | |
|---|---|---|---|---|
| 594,627 | A * | 11/1897 | Hewlett | 211/22 |
| 621,819 | A * | 3/1899 | Ivatt | 410/3 |
| 706,718 | A * | 8/1902 | Bradbury | 211/22 |
| 2,329,088 | A * | 9/1943 | Schram et al. | 211/17 |
| 2,379,572 | A * | 7/1945 | Gibson | 248/158 |
| 4,057,182 | A * | 11/1977 | Kolkhorst et al. | 224/403 |
| D298,193 | S | 10/1988 | Carlson | |
| 5,083,729 | A * | 1/1992 | Saeks et al. | 211/22 |
| 5,137,158 | A * | 8/1992 | Brockway | 211/106.01 |
| 5,492,228 | A * | 2/1996 | Botkin | 211/85.7 |
| 5,642,820 | A | 7/1997 | Angeles | |
| D391,706 | S * | 3/1998 | Malcolm | D32/35 |
| 5,842,581 | A | 12/1998 | Graefe | |
| D437,164 | S | 2/2001 | Fickett | |
| 6,182,836 | B1 * | 2/2001 | Gutierrez | 211/22 |
| 6,484,888 | B2 | 11/2002 | Miller | |
| 6,494,327 | B2 * | 12/2002 | Huang | 211/17 |
| 6,679,388 | B1 * | 1/2004 | Chiu | 211/22 |
| 6,820,842 | B1 * | 11/2004 | Chuang | 248/125.8 |
| 6,983,853 | B1 | 1/2006 | Fickett | |
| 7,000,783 | B2 | 2/2006 | Webb | |
| 2002/0134742 | A1 * | 9/2002 | Huang | 211/17 |
| 2003/0134701 | A1 * | 7/2003 | Nye | 473/479 |
| 2004/0050807 | A1 * | 3/2004 | Cheng | 211/17 |
| 2005/0090336 | A1 * | 4/2005 | Nye et al. | 473/446 |

* cited by examiner

*Primary Examiner* — Jonathan Liu
*Assistant Examiner* — Patrick Hawn
(74) *Attorney, Agent, or Firm* — Robert C. Montgomery; Montgomery Patent & Design

(57) ABSTRACT

A freestanding bicycle storage rack for use in garages and other areas, comprising a large freestanding "T"-shaped frame attachable to a base portion supported by a large weighted stand member, is similar in appearance and style to the base stands used on portable basketball hoops. An upper cross member of the frame is provided with a plurality of large hooks attached to the bottom of the upper cross member on each side. Bicycles are hoisted up and attached to the hanging hooks by their front or rear tires. Scooters and other similar devices may also be stored using the same hooks. These features provide the ability to store bicycles off of the floor without connections to a wall, ceiling, or other building structures.

7 Claims, 4 Drawing Sheets

BICYCLE STORAGE TREE

RELATED APPLICATIONS

The present invention was first described in a notarized Official Record of Invention on Dec. 12, 2008, that is on file at the offices of Montgomery Patent and Design, LLC, the entire disclosures of which are incorporated herein by reference.

FIELD OF THE INVENTION

The present invention relates generally to bicycles and similar vehicles, and in particular, to a portable storage rack particularly adapted for use with such vehicles.

BACKGROUND OF THE INVENTION

Bicycles and similar non-motor vehicles such as scooters are a popular alternate form of transportation as well as a common choice for outdoor exercising. While these items offer many benefits, one (1) problem commonly associated with them is that of storage. Bicycles tend to take up a disproportionate amount of space due to their peculiar dimensions, need for ease of access, and the like. Such vehicles are often stored in a garage, where space is at a premium. Furthermore, bicycles and the like generally accommodate a single user, requiring families and the like to own and store a separate bicycle for each user.

Various attempts have been made to provide bicycle storage devices. Examples of these attempts can be seen by reference to several U.S. patents. U.S. Pat. No. 5,842,581, issued in the name of Graefe, describes a portable bicycle repair rack which attaches to a conventional door to provide hanging support of the bicycle.

U.S. Pat. No. 6,983,853, issued in the name of Fickett, describes a portable modular storage support device which engages a vertical wall in order to provide a means for suspending a desired item above a floor surface.

U.S. Pat. No. 7,000,783, issued in the name of Webb, describes a utility hook which provides a means for suspending bicycles or the like from a standard overhead garage door track.

Additionally, ornamental designs for a bicycle rack exist, particularly U.S. Pat. Nos. D 298,193 and D 437,164. However, none of these designs are similar to the present invention.

While these devices fulfill their respective, particular objectives, each of these references suffer from one (1) or more of the aforementioned disadvantages. Many such devices are not easily portable. Also, many such devices are not adjustable. Furthermore, many such devices do not provide efficient special storage of a plurality of bicycles or the like. In addition, many such devices are not freestanding. Accordingly, there exists a need for a bicycle storage apparatus without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to store a plurality of bicycles in a manner which is space efficient while providing features of adjustability, portability, and a freestanding design which can be utilized in any location. Thus, the object of the present invention is to solve the aforementioned disadvantages and provide for this need.

To achieve the above objectives, it is an object of the present invention to provide a means for storing bicycles, scooters, or the like off a ground surface. The apparatus comprises a freestanding "T"-shape which further comprises a horizontal member, a plurality of hooks, an adjustable post, a fixed post, and a base.

Another object of the present invention is to provide suspending support for bicycles or similar items via the plurality of hooks.

Yet still another object of the present invention is to provide secure freestanding support to a plurality of bicycles or the like via the base portion. The base comprises a hollow rectangular base which is filled with a heavy weighted material.

Yet still another object of the present invention is to allow for easy transport of the apparatus via a pair of wheels located on a bottom surface of the base.

Yet still another object of the present invention is to allow for vertical height adjustment of the apparatus via relative motion of the adjustable post inside the fixed post. The fixed post comprises a vertical post integrally molded into the base.

Yet still another object of the present invention is to allow a user to selectively securely lock the adjustable post in a desired vertical position via a pin which simultaneously engages corresponding apertures in the fixed post and adjustable post.

Yet still another object of the present invention is to provide a means to support a plurality of bicycles or similar items on the horizontal member. The horizontal member comprises a rectangular member which is integrally attached to the adjustable post. The horizontal member further comprises a plurality of equally spaced hooks along a bottom surface for compact storage of a plurality of items.

Yet still another object of the present invention is to provide a method of utilizing the apparatus that provides a unique means of locating the apparatus in a desired location, providing a weighting material to the base, selectively adjusting the height of the adjustable post, locking the adjustable post in a desired position via the locking pin, storing a plurality of bicycles or similar items in a compact manner by suspension from the hooks, and easily transporting the apparatus via the wheels.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
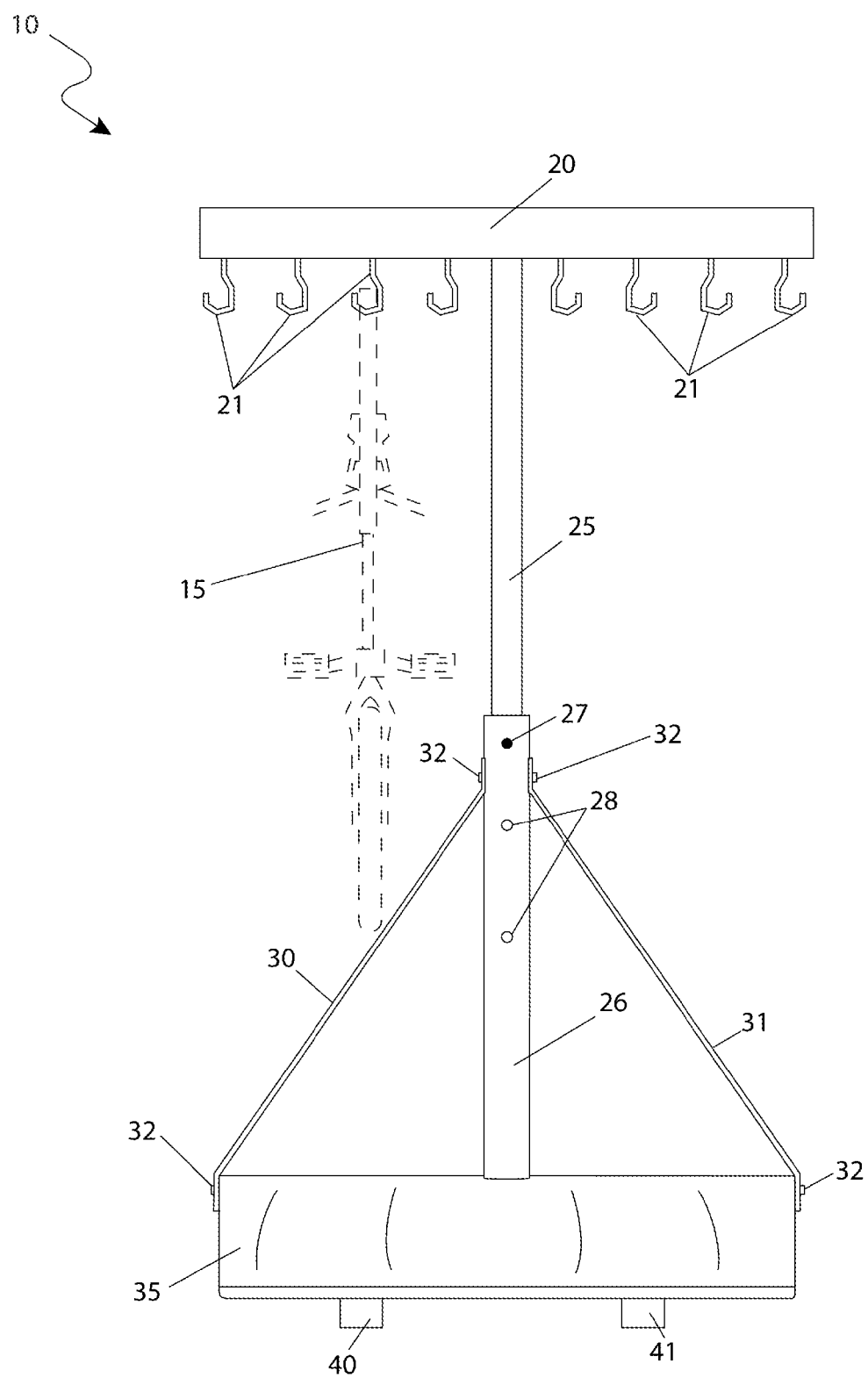
FIG. 1 is an environmental view of a bicycle storage tree 10, according to a preferred embodiment of the present invention.

DESCRIPTIVE KEY 10 bicycle storage tree
15 bicycle
20 horizontal member
21 hook
25 adjustable post
26 fixed post
27 pin
28 aperture
30 first strut
31 second strut
32 fastener
35 base
36 cavity
37 weighted portion
38 weighted material
40 first wheel
41 second wheel
42 axle
43 axle mount

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a bicycle storage tree (herein described as the "apparatus") 10, which provides a means for storing bicycles 15, scooters, or the like off a ground surface which comprises transportable and adjustable features. The apparatus 10 comprises a freestanding "T"-shape which further comprises a horizontal member 20, a plurality of hooks 21, an adjustable post 25, a fixed post 26, and a base 35. Said apparatus 10 comprises a maximum height of approximately seven (7) feet and is fabricated from materials such as, but not limited to: plastic, metal, wood, or the like.

Referring now to FIG. 1, an environmental view of the apparatus 10, according to the preferred embodiment of the present invention, is disclosed. The apparatus 10 is preferably positioned on a level surface in a desired storage area. Bicycles 15 or other similar devices are suspended from the apparatus 10, thereby providing an additional or alternate means for suspending and storing bicycles 15 or similar devices. The apparatus 10 comprises a rectangular base 35 which is positioned superjacent to a desired level surface. Said base 35 provides an anchoring support means to the apparatus 10. A bottom surface of the base 35 comprises a first wheel 40, a second wheel 41, and a weighted portion 37 (see FIGS. 3 and 4). A rear upper surface of the base 35 comprises a vertical fixed post 26, a first strut 30, and a second strut 31. The fixed post 26 provides an attachment means to an adjustable post 25 (also see FIG. 2). A bottom surface of the fixed post 26 is integrally molded to the base 35 via conventional plastic molding techniques, metal welding, or the like. An upper longitudinal front surface of the fixed post 26 comprises a plurality of apertures 28, thereby providing an engaging means to a pin 27 located thereon the adjustable post 25 utilized for the height adjustment means of the apparatus 10 (also see FIG. 2). The first strut 30 and second strut 31 reinforce the fixed post 26 to side surfaces of the base 35, thereby supporting the apparatus 10 in a vertical manner. The struts 30, 31 are positioned on opposing side surfaces and are attached to a side surface of the base 35 and side surfaces of the fixed post 26, respectively, via conventional fasteners 32 such as, but not limited to: screws, welding, or the like.

Figure 2:
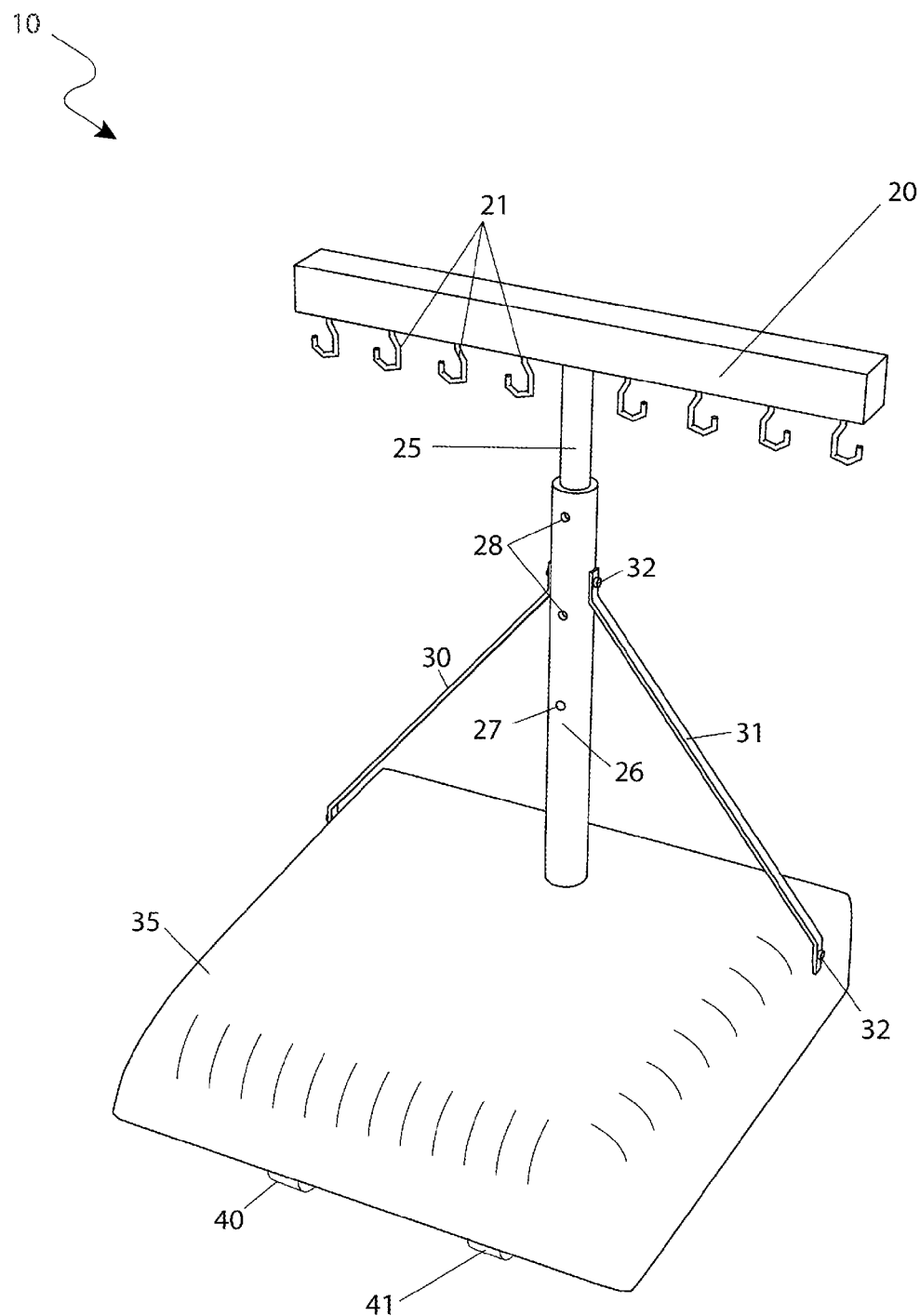
FIG. 2 is a side perspective view of the bicycle storage tree 10, according to a preferred embodiment of the present invention.

Referring now to FIG. 2, a side perspective view of the apparatus 10, according to the preferred embodiment of the present invention, is disclosed. The apparatus 10 comprises an adjustable post 25, thereby providing the abovementioned height adjustment means and providing the suspending means to bicycles 15. A lower longitudinal front surface of the adjustable post 25 comprises a pin 27 which engages a desired aperture 28 thereon the fixed post 26, thereby adjusting the height of the apparatus 10. The pin 27 is comprised of a conventional spring-loaded detent pin, yet other mechanical devices may be utilized without limiting the features of the apparatus 10. In use, a user inserts the adjustable post 25 into the fixed post 26 downwardly sliding said adjustable post 25 to a desired height, thereby enabling the pin 27 to be positioned into a desired aperture 28 and locking the adjustable post 25 in position.

An upper distal surface of the adjustable post 25 is integrally molded to a horizontal member 20, thereby providing a surface for placement of a plurality of hooks 21. The rectangular horizontal member 20 is positioned perpendicular to the adjustable post 25 at an intermediate position. A bottom surface of the horizontal member 20 comprises the plurality of equally spaced hooks 21, thereby providing a suspending means to up to eight (8) bicycles 15, scooters, or the like. The hooks 21 are illustrated herein as being preferably positioned outwardly facing with respect to the adjustable post 25 and equally spaced linear fashion, yet it is known that other hook 21 arrangements may be provided without limiting the functions of the apparatus 10. Said hooks 21 are conventional curved devices utilized for suspending objects. In use, preferably a tire portion of a bicycle 15 is positioned onto a desired hook 21, thereby suspending said bicycle 15 from the apparatus 10.

Figure 3:
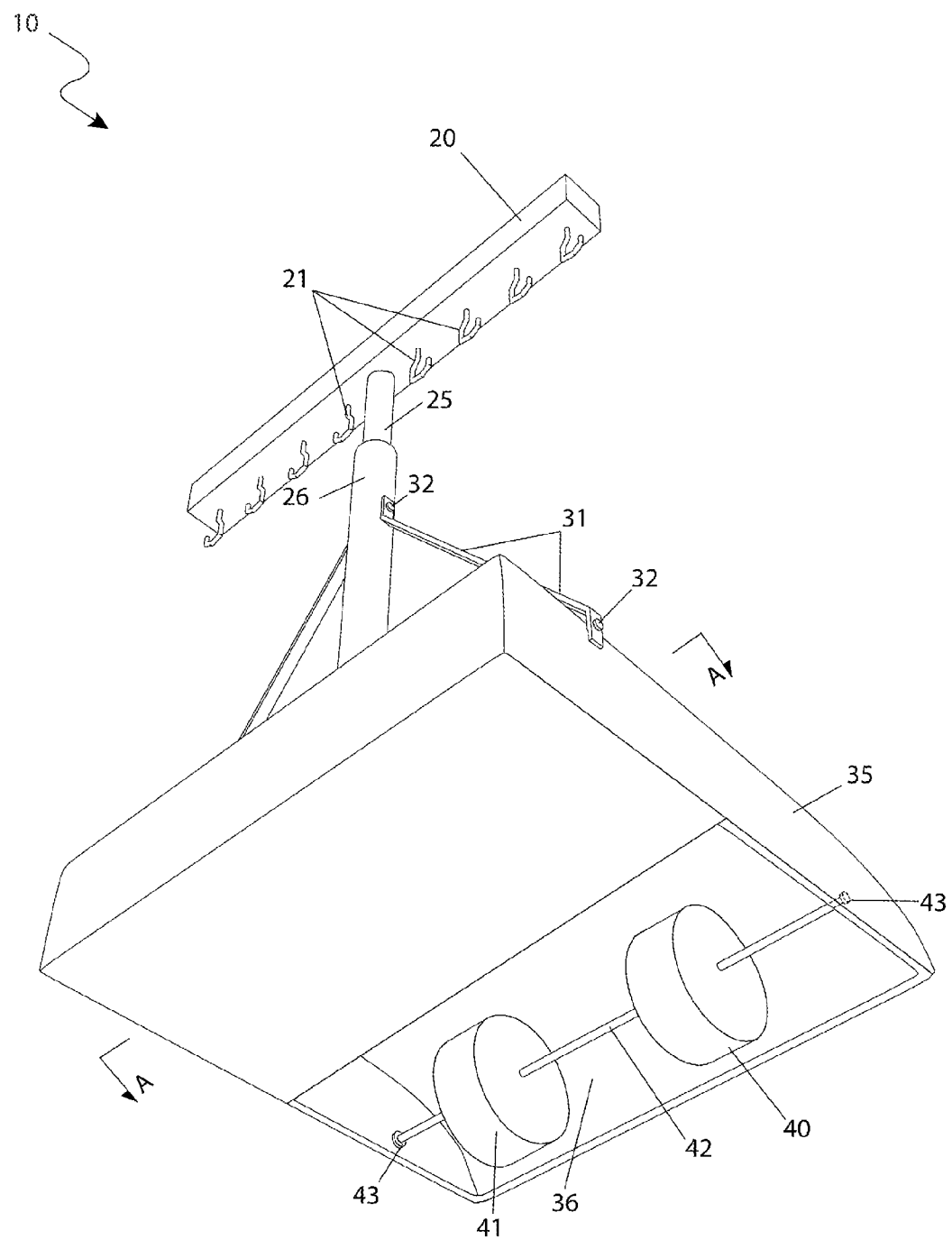
FIG. 3 is a bottom perspective view of the bicycle storage tree 10, according to a preferred embodiment of the present invention; and, FIG. 4 is a section view of the bicycle storage tree 10 taken along line A-A (see FIG. 3), according to a preferred embodiment of the present invention.
Figure 4:
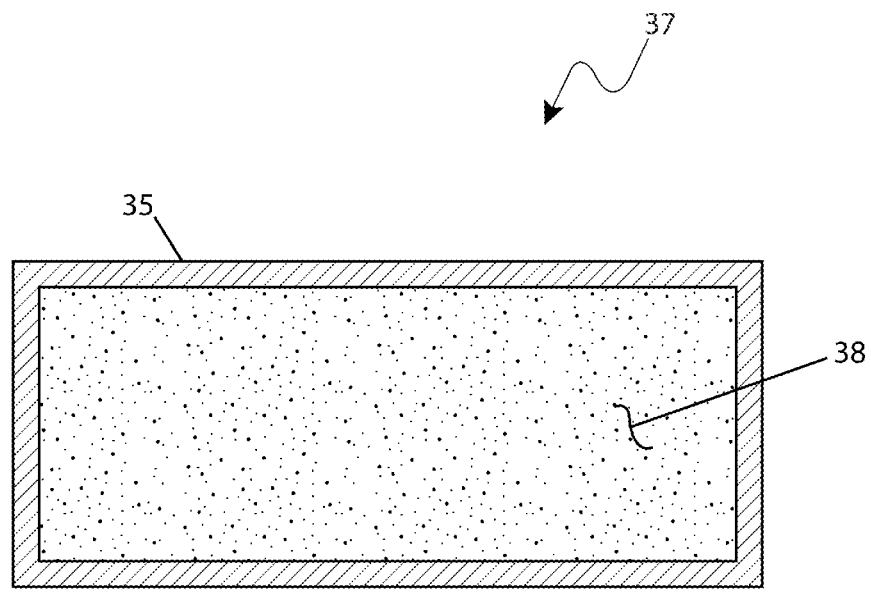

Referring now to FIG. 3, a bottom perspective view of the apparatus 10 and FIG. 4, a section view of the apparatus 10 taken along line A-A (see FIG. 3), according to the preferred embodiment of the present invention, are disclosed. A bottom portion of the apparatus 10 comprises a weighted portion 37, a first wheel 40, and a second wheel 41. The rectangular weighted portion 37 provides a ballast feature to the apparatus 10, thereby stabilizing said apparatus 10 when in use. Said weighted portion 37 comprises a hollow internal portion which further filled with a heavy weighted material 38 which is preferably sand, yet other materials may be utilized such as, but not limited to: water, gravel, or the like. Said weighted portion 37 encompasses a rear to intermediate portion of the base 35, directly aft of the cavity 36.

The first wheel 40 and second wheel 41 provide a means to transport the apparatus 10 to a desired location. Said wheels 40, 41 are located at a front portion of a cavity 36 and are attached to via an axle 42 which is further attached to opposing side surfaces of the cavity 36 via axle mounts 43. The axle mounts 43 are integrally molded to the side surfaces and secure the axle 42 thereto, thereby enabling the wheels 40 41 to rotate about respective axis in a conventional manner. The wheels 40, 41 are approximately sized with regards to clearance of the cavity 36 and are fabricated from materials such as, but not limited to: plastic, metal, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; positioning the base 35 superjacent to a desired level surface; transporting said apparatus 10 to a desired location via moving the wheels 40, 41; inserting the adjustable post 25 into the fixed post 26; adjusting the height of said apparatus 10 via positioning the pin 27 on the adjustable post 25 into a desired aperture 28 on the fixed post 26; suspending up to eight (8) bicycles 15 thereon the hooks 21, thereby storing said bicycles 15; removing the bicycles 15 from the hooks 21 for use thereof; and, storing bicycles 15 or other similar devices in a manner which keeps them off of the ground, but does not require a connection to a building or other permanent structure.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A storage device for storing and displaying a plurality of items, comprising:
   a base assembly;
   an adjustable post assembly, having a lower portion vertically extending from and attached to said base assembly;
   a horizontal member attached at a central point to an upper portion of said adjustable post assembly; and,
   a plurality of hooks attached to said horizontal member;
   wherein said storage device is placed on a horizontal surface;
   wherein said plurality of hooks provides a storage means and a display means to said plurality of items;
   wherein said base assembly provides an anchoring means to said storage device and said plurality of items stored thereon;
   wherein said base assembly further comprises a generally rectangular shape, comprising a bottom surface, an upper surface, a front wall, a rear wall and a pair of opposing side walls;
   wherein said base assembly further comprising a rectangular weighted portion located within a rear portion thereof, further comprising a hollow internal portion filled with a weighted material;
   wherein said base further comprises a wheel assembly, further comprising:
   a cavity located at a front portion of said bottom surface;
   an axle spanning a width of said cavity and attached to opposing inner side surfaces thereof with a pair of axle mounts; and,
   a first wheel and second wheel each rotatably connected to said axle and each providing a diameter enabling clearance of said cavity;
   wherein said wheel assembly provides a transportation means for said storage device;
   wherein said adjustable post assembly further comprises:
   a fixed post, comprising a bottom end integrally molded to a rear portion of said upper surface;
   a first strut and a second strut attached to opposing side surfaces of said fixed post at each upper ends and to opposing side walls of said base at each second end;
   an adjustable post slidingly engaged with said fixed post; and,
   an adjustment means for securing said adjustable post to said fixed post;
   wherein said first strut and said second strut reinforce said fixed post to said side walls of said base;
   wherein said adjustable post is slidably adjustable within said fixed post to a desired height; and,
   wherein said adjustment means secures said adjustable post to said fixed post at said desired height;
   wherein each of said rear wall and said pair of opposing side walls is entirely planar;
   wherein each of said first and second struts has a top end, a bottom end and a medial section obliquely angled relative to said top and bottom ends; said top end being registered parallel to said bottom end, said rear wall as well as said pair of opposing side walls;
   wherein said pair of axle mounts are located at outer faces of said pair of opposing side walls respectively;
   wherein said first and second wheels are located proximate to said front wall and distally to said rear wall; and,
   wherein said bottom end of said fixed post is located proximate to said rear wall and distally to said front wall such that said first and second wheels are oppositely spaced from said bottom end of said fixed post.

2. The storage device of claim 1, wherein said adjustment means further comprises:
   a spring-loaded pin located on a lower longitudinal front surface of said adjustable post; and,
   a plurality of apertures located on an upper longitudinal front surface of said fixed post;
   wherein said spring-loaded pin is removably inserted into one of said plurality of apertures at said desired height.

3. The storage device of claim 1, wherein said horizontal member further comprises a generally rectangular member positioned perpendicular to said adjustable post assembly.

4. The storage device of claim 3, wherein said plurality of hooks are equidistantly spaced from each other on a bottom surface of said horizontal member and further comprise a first set of a plurality of hooks and a second set of a plurality of hooks on either side of said adjustable post assembly.

5. The storage device of claim 4, wherein said first set of a plurality of hooks and said second set of a plurality of hooks face outward relative to said adjustable post assembly.

6. The storage device of claim 5, wherein said plurality of hooks further comprise a total of eight hooks.

7. The storage device of claim 1, wherein said plurality of items further comprises at least one bicycle.

\* \* \* \* \*